(12) United States Patent
Ribeiro et al.

(10) Patent No.: US 9,351,340 B2
(45) Date of Patent: May 24, 2016

(54) APPARATUS AND METHOD FOR MODE SELECTION FOR DEVICE-TO-DEVICE COMMUNICATIONS

(75) Inventors: Cassio Barboza Ribeiro, Espoo (FI); Klaus Franz Doppler, Espoo (FI); Timo Kalevi Koskela, Oulu (FI); Tao Chen, Oulu (FI); Sami-Jukka Hakola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 843 days.

(21) Appl. No.: 12/420,591

(22) Filed: Apr. 8, 2009

(65) Prior Publication Data

US 2010/0261469 A1    Oct. 14, 2010

(51) Int. Cl.
*H04W 99/00* (2009.01)
*H04W 24/10* (2009.01)
*H04W 92/18* (2009.01)
*H04W 52/38* (2009.01)

(52) U.S. Cl.
CPC .............. *H04W 99/00* (2013.01); *H04W 24/10* (2013.01); *H04W 52/383* (2013.01); *H04W 92/18* (2013.01)

(58) Field of Classification Search
None
See application file for complete search history.

(56) References Cited

U.S. PATENT DOCUMENTS

| 5,396,647 | A | * | 3/1995 | Thompson et al. | 455/440 |
|---|---|---|---|---|---|
| 6,047,178 | A | | 4/2000 | Frlan | |
| 6,580,704 | B1 | | 6/2003 | Wellig et al. | |
| 7,151,795 | B1 | * | 12/2006 | Goldburg | 375/227 |
| 7,164,930 | B2 | | 1/2007 | Korneluk | |
| 7,283,832 | B2 | * | 10/2007 | Jia et al. | 455/517 |
| 7,309,266 | B2 | | 12/2007 | Botsaris et al. | |
| 7,734,292 | B2 | | 6/2010 | Cho et al. | |
| 2004/0267910 | A1 | * | 12/2004 | Treppa et al. | 709/220 |
| 2005/0030924 | A1 | * | 2/2005 | Yano et al. | 370/332 |
| 2005/0239451 | A1 | * | 10/2005 | Periyalwar | H04W 52/383 455/425 |
| 2006/0160544 | A1 | | 7/2006 | Sun | |
| 2006/0168343 | A1 | * | 7/2006 | Ma et al. | 709/245 |
| 2007/0136473 | A1 | * | 6/2007 | Birchler et al. | 709/226 |
| 2007/0160162 | A1 | * | 7/2007 | Kim et al. | 375/267 |
| 2007/0197251 | A1 | * | 8/2007 | Das et al. | 455/522 |
| 2008/0026797 | A1 | * | 1/2008 | Nanda et al. | 455/562.1 |
| 2008/0031193 | A1 | | 2/2008 | Laroia et al. | 370/331 |

(Continued)

FOREIGN PATENT DOCUMENTS

| EP | 1921873 A1 | 5/2008 |
|---|---|---|
| EP | 1998499 A1 | 12/2008 |

(Continued)

OTHER PUBLICATIONS

International Search Report and Written Opinion for corresponding PCT Application No. PCT/IB2010/000532 mailed Jul. 19, 2010, 15 pages.

(Continued)

*Primary Examiner* — Huy D Vu
*Assistant Examiner* — James P Duffy
(74) *Attorney, Agent, or Firm* — Harrington & Smith (57) ABSTRACT

In accordance with an example embodiment of the present invention, a method is disclosed that comprises measuring a first link quality of a first link based at least in part on a first power value; measuring a second link quality of a second link based at least in part on a second power value; and determining a suitable device-to-device (D2D) mode for a D2D connection based at least in part on the first link quality, the second link quality, and one or more D2D user equipment (UE) constraints.

17 Claims, 7 Drawing Sheets

(56) References Cited

U.S. PATENT DOCUMENTS

| | | | |
|---|---|---|---|
| 2008/0069028 A1* | 3/2008 | Richardson | 370/328 |
| 2009/0005094 A1 | 1/2009 | Lee et al. | 455/509 |
| 2009/0016261 A1 | 1/2009 | Laroia et al. | 370/328 |
| 2009/0019113 A1* | 1/2009 | Wu et al. | 709/204 |
| 2009/0034447 A1 | 2/2009 | Yu et al. | 370/315 |
| 2009/0168689 A1* | 7/2009 | Itagaki et al. | 370/315 |
| 2009/0238155 A1* | 9/2009 | Sun | 370/336 |
| 2009/0325625 A1 | 12/2009 | Ribeiro et al. | |
| 2010/0009675 A1* | 1/2010 | Wijting et al. | 455/426.1 |
| 2010/0069091 A1* | 3/2010 | El-Saidny | 455/456.3 |

FOREIGN PATENT DOCUMENTS

| | | |
|---|---|---|
| WO | 2004077920 A2 | 9/2004 |
| WO | 2004088874 A2 | 10/2004 |
| WO | WO 2006/016331 A1 | 2/2006 |
| WO | 2007082036 A1 | 7/2007 |
| WO | 2010007498 A1 | 1/2010 |
| WO | 2010/084411 A1 | 7/2010 |

OTHER PUBLICATIONS

Klaus Doppler et al., "Device-to-Device Communication as an Underlay to LTE-Advanced Networks", IEEE Communications Magazine, Dec. 1, 2009, IEEE Service Center, Piscataway, US, vol. 47, NR12, p. 42-49.

"Battery Consumption and Handoff Examination of a Cellular Ad-Hoc United Communication System for Operational Mobile Robots", Tomoko Adachi et al., IEEE , 1998, pp. 1193-1197.

Kaufman, et al., Cellular Networks With an Overlaid Device to Device Network, XP031475555, Oct. 26, 2008, (pp. 1537-1541).

* cited by examiner

APPARATUS AND METHOD FOR MODE SELECTION FOR DEVICE-TO-DEVICE COMMUNICATIONS

TECHNICAL FIELD

The present application relates generally to an apparatus and a method for mode selection for device-to-device communications.

BACKGROUND

In a cellular network mode, data traffic usually goes through centralized controller such as a base station (BS) even if the communicating devices are close to each other. One benefit of the centralized operation is easy resource control and interference control. One potential drawback is less efficient resource utilization. A double amount of resources may be needed for a user equipment (UE) in a cellular mode. For example, a cellular UE may need to have a first radio resource allocated between the cellular UE and the base station and a second radio resource allocated between the base station and the other cellular UE. Examples of the centralized controller may include evolved Node B (eNB) of long-term evolution (LTE).

In comparison, a UE in a direct, device-to-device (D2D) mode may only need one radio resource between the UE and a pairing UE, when two users are sufficiently close to each other. To help improve system throughput, a radio network may operate in a D2D mode. A UE may operate in the cellular mode if the other party is located far way and may operate in the D2D mode if the pairing UE is sufficiently close by. Mixed cellular and D2D modes are being explored in newer generations of wireless technologies such as $3^{rd}$ generation partnership project (3GPP) long-term evolution-advanced (LTE-A) and worldwide interoperability for microwave access (WiMax) network. One example of D2D mode network is an ad-hoc network where one D2D UE may set up a direct connection with the pairing UE via a handshake and competition procedure. Examples of cellular networks include widely deployed wireless networks such as universal mobile telecommunications system (UMTS) network, code division multiple access (CDMA) network, WiMax network and 3GPP LTE networks.

In the D2D mode, two D2D UEs may share downlink or uplink resources with cellular mode UEs. These shared links may be referred to as shared uplinks and shared downlinks hereafter. Alternatively the two D2D UEs may use dedicated cellular uplink or dedicated cellular downlink resources for D2D communications. In these resources dedicated for D2D communications no cellular mode communication takes place within a cell, a part of a network or the whole network. These dedicated links may be referred as dedicated uplinks and dedicated downlinks hereafter. Thus a pair of UEs in the D2D mode may be further defined as in one of the following four resource allocation modes: a reusing downlink mode, a reusing uplink mode, a dedicated downlink mode, and a dedicated uplink mode. A special case is that when the two D2D UEs fail to acquire any of the four resource allocation modes, they may turn to cellular mode operation. In this case, the cellular mode may be viewed as a special case of the D2D resource allocation mode. Hence, the term D2D mode refers to one of the D2D resource allocation modes hereafter unless specified otherwise.

SUMMARY

Various aspects of the invention are set out in the claims.

In accordance with an example embodiment of the present invention, a method comprises measuring a first link quality of a first link based at least in part on a first power value; measuring a second link quality of a second link based at least in part on a second power value; and determining a suitable device-to-device (D2D) mode for a D2D connection based at least in part on the first link quality, the second link quality, and one or more D2D user equipment (UE) constraints.

In accordance with an example embodiment of the present invention, a method comprises collecting a plurality of link quality measures upon receiving one of a device-to-device (D2D) connection request and a D2D connection reevaluation request from a D2D user equipment (UE) and a pairing D2D UE; removing an D2D mode from a D2D mode list if the D2D mode fails to meet a quality criterion based at least in part on the collected plurality of link quality measures; sorting the D2D mode list based at least in part on the plurality of D2D link quality measures; and determining a suitable D2D mode based at least in part on the sorted D2D mode list and a network state.

In accordance with another example embodiment of the present invention, an apparatus comprises a first module configured to measure a first link quality of a first link based at least in part on a first power value; and to measure a second link quality of a second link based at least in part on a second power value. The apparatus also comprises a second module configured to determine a suitable device-to-device (D2D) mode for a D2D user equipment (UE) to establish a D2D connection to a pairing D2D UE based at least in part on the first link quality, the second link quality, and at least one D2D UE constraints.

BRIEF DESCRIPTION OF DRAWINGS

For a more complete understanding of example embodiments of the present invention, reference is now made to the following descriptions taken in connection with the accompanying drawings in which.

DETAILED DESCRIPTION

Either a D2D UE or a central controller may determine a D2D mode for a direct D2D connection between the D2D UE and the pairing D2D UE. One factor that may substantially affect the D2D mode selection is transmitting power value, which in turn affects the interference level to a D2D connection and thus the link quality. The decision may also depend on the factors such as available dedicated resources and shared cellular resources. The decision may also depend on the current state of the network such as the number of active cellular users in the system, the number of D2D connections already admitted and the like. It may also depend on the D2D link quality in each available D2D communication mode, as well as the quality of the cellular link. In addition, the determination of the D2D mode may also depend on the multi-antenna processing capability available at the coupled base station and at the D2D UEs.

An example embodiment of the present invention and its potential advantages are understood by referring to FIGS. 1 through 7 of the drawings, like numerals being used for like and corresponding parts of the various drawings.

Figure 1:
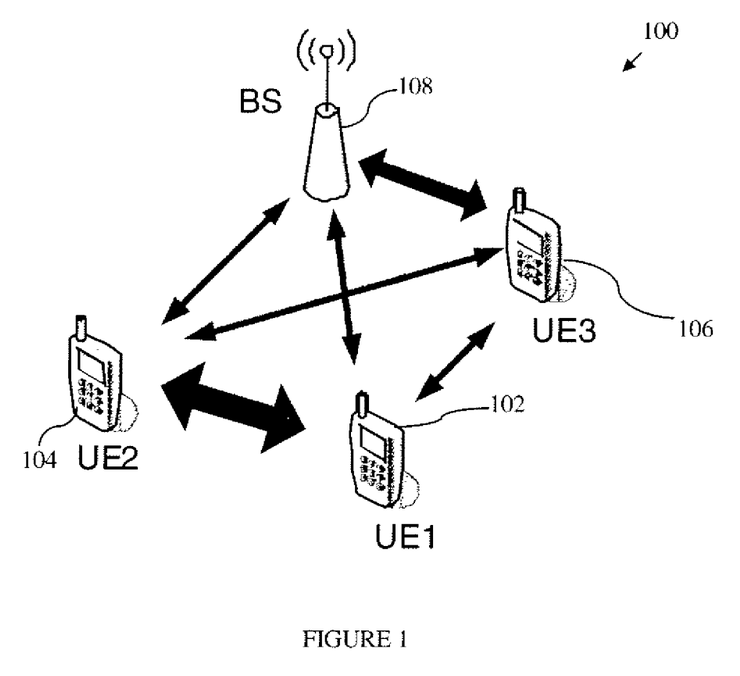
FIG. 1 illustrates an example wireless system.

FIG. 1 illustrates an example wireless system 100. The wireless system 100 may include a D2D UE1 102, a D2D UE2 104, a cellular UE3 106, a base station 108 and a set of wireless links coupling the UEs 102, 104, and 106, and the base station 108.

The D2D UEs 102 and 104 may establish a D2D connection between them. The D2D connection may be in one of the D2D modes that include the reusing uplink mode, the reusing downlink mode, the dedicated uplink mode, the dedicated downlink mode, and the cellular mode. The cellular mode indicates that the two D2D UEs may not establish a direct D2D connection and may go through a base station to communicate with each other, as in normal cellular communications. Either the D2D UEs 102 and 104 or cellular UE 106 may use both frequency division duplex (FDD) and time division duplex (TDD) cellular operation, though FDD operations may require some additional hardware at the UE.

FIG. 1 may illustrate a D2D communication scenario. In this scenario, the D2D UE1 102 may establish a D2D connection with the pairing D2D UE2 104. The cellular UE3 106 may establish a cellular connection with the base station 108. Following are two examples of ways in which a D2D mode may be determined. One way is that one or both of the communicating D2D UEs 102 and 104 together determine a suitable D2D mode based on the information the D2D UEs have. An alternative method is that the coupled base station 108, after collecting the link quality data from the communicating D2D UEs 102 and 104, may determine a suitable D2D mode on behalf of the communicating D2D UEs. Either method may take into consideration the parameters such as D2D link quality and various network constraints.

Figure 4:
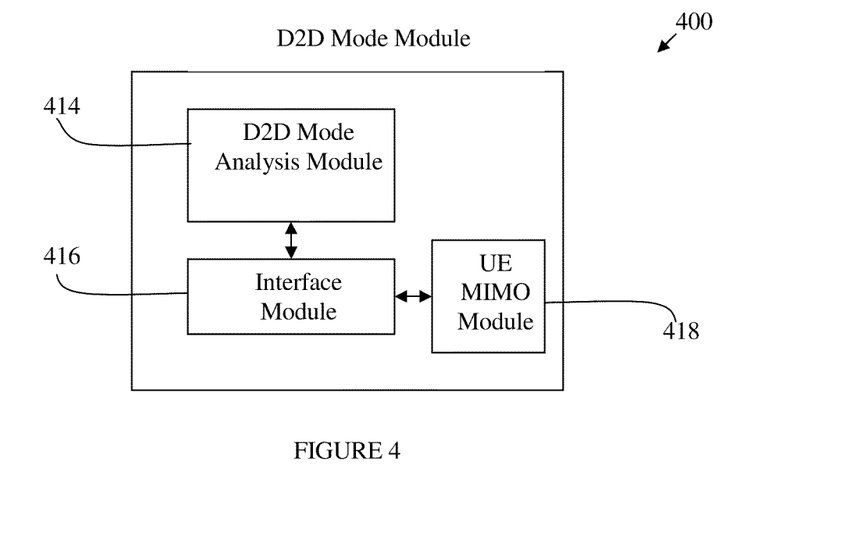
FIG. 4 illustrates an example UE D2D mode module.
Figure 7:
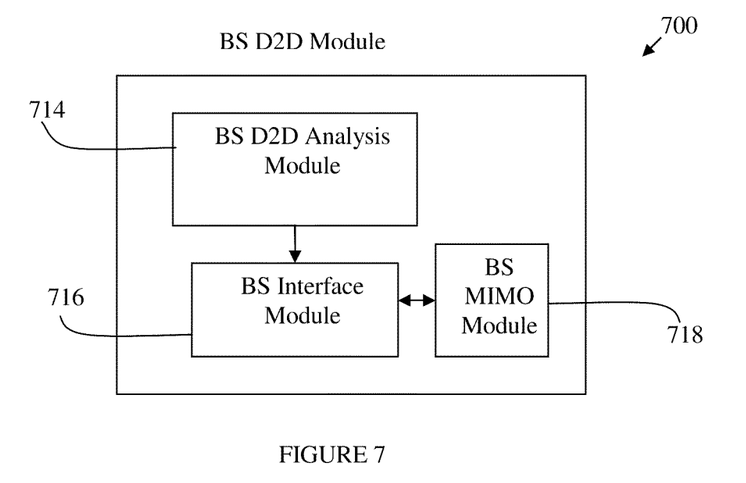
FIG. 7 illustrates an example BS D2D mode module.

A D2D UE, for example, UE1 102 or UE2 104 may include a D2D mode module 400 as one of its components to help decide the suitable D2D mode for the D2D connection between the D2D UE1 102 and the pairing D2D UE2 104. An example of the D2D mode module 400 is illustrated in FIG. 4 and described thereinafter. The base station 108 may include a BS D2D module as its components to help decide a D2D mode for a pair of D2D UEs such as UE1 and UE2 of FIG. 1 that have requested the base station 108 to help decide a D2D mode or re-evaluate an existing D2D mode. An example of the BS D2D module 700 is illustrated in FIG. 7 and described thereinafter.

Figure 2:
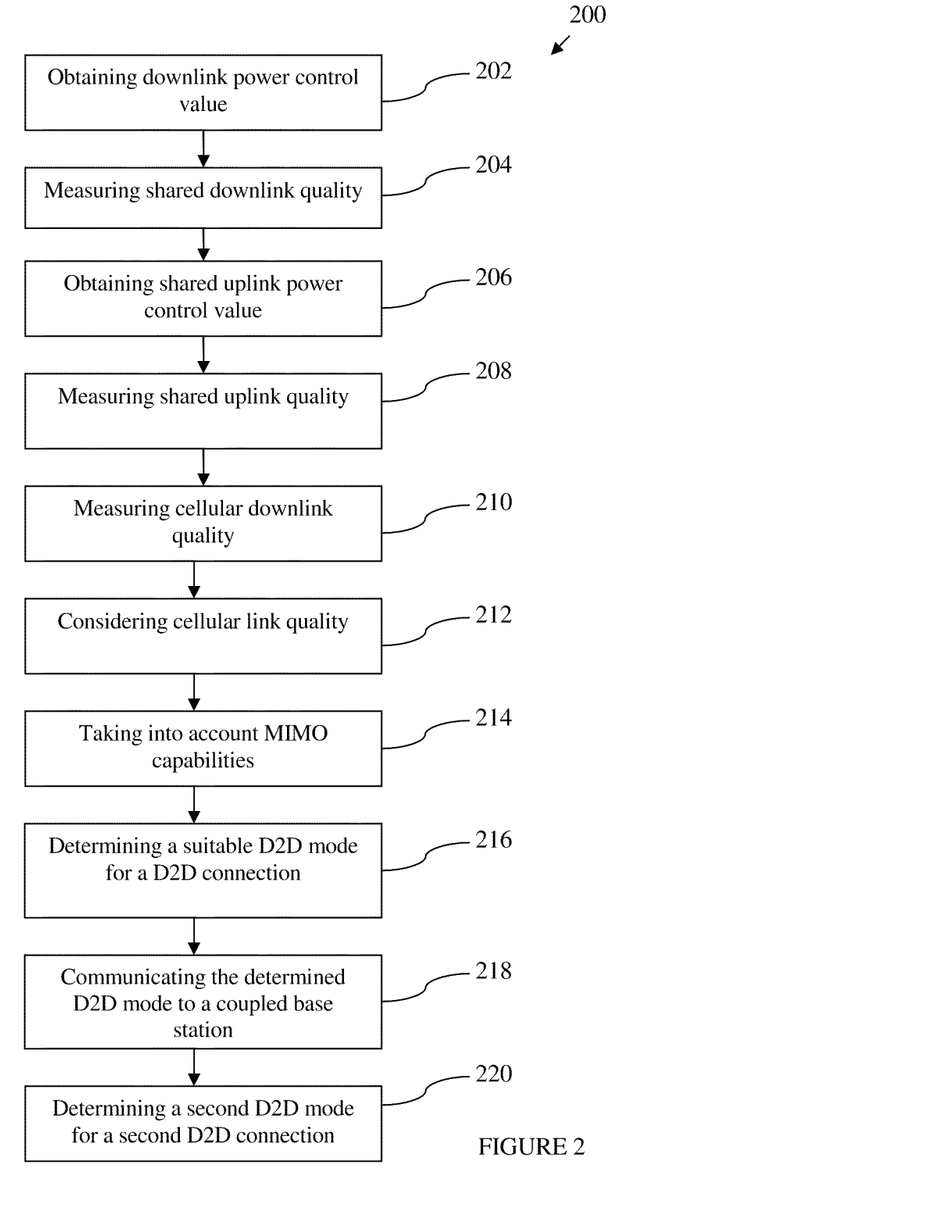
FIG. 2 illustrates an example method for determining a D2D mode at a D2D UE.

FIG. 2 illustrates an example method 200 for determining a D2D mode at a D2D UE. The method 200 may include obtaining a downlink power value at block 202, and measuring shared downlink quality at block 204. The method 200 also may include obtaining an uplink power value at 206, measuring a shared uplink quality at block 208, measuring one or more cellular downlink qualities at block 210, and considering cellular downlink quality and dedicated links at block 212. The method 200 also may include taking into account multiple-input and multiple-output (MIMO) antenna capabilities at block 214, determining a D2D mode for a D2D connection at block 216, communicating the determined D2D mode to a coupled base station at block 218, and determining a second D2D mode for a second D2D connection at block 220. Other embodiments of the method 200 with different sequences of the steps could be used without departing from the scope of this disclosure. In an example embodiment, the method 200 is performed by the D2D Mode Module 400 of FIG. 4 and the UE1 102 or UE2 104 of FIG. 1.

Obtaining a downlink power value at block 202 may involve getting a maximum transmitting power that the D2D UE such as UE1 102 or UE2 104 of FIG. 1 may be allowed to use. Getting the maximum transmitting power may be requesting the power values from the coupled base station 108 that may determine the maximum transmitting power the D2D UEs can use, considering overall network conditions. Alternatively, getting the maximum transmitting power may be using a maximum allowed power value as defined by a particular industrial standard. The maximum UE transmitting power may heavily influence the amount of interference the UE produces to the neighbor UEs and thus is a substantial factor to be taken into account for determining the suitable D2D mode. In some cases the coupled base station 108 may determine the power values before it assigns the resources. In this case the UEs may first assist the base station to obtain the power values. In some other cases, for example, the downlink may not be available for the D2D communication and the coupled base station 108 may assign cellular uplink resources for the probing signal to measure the link quality.

Measuring shared downlink quality at block 204 may include sending a probing signal to its pairing D2D UE or other UEs for the pairing D2D UE to measure the link quality. Measuring shared downlink quality at block 204 may also include taking into account the interference caused by the D2D UEs to the cellular UEs or neighboring base stations in case of a TDD network with different DL/UL switching points. The base station can assign resources for the probing signal in response to a D2D communication request for the power values. If the D2D communication request is initiated by the base station such as eNB, it may send the power values and the assigned resources to the requesting D2D UE.

Obtaining an uplink power value at 206 may include requesting a maximum transmitting power from the coupled base station 108. Measuring a shared uplink quality at block 208 is similar to measuring the shared downlink quality and may include sending a probing signal to the pairing D2D UEs or other neighbor D2D UE based on the obtained power values. Then the receiving UE may measure the quality of transmitted probing signal in comparison to the interference level it observes. Measuring a cellular downlink quality at block 210 may also include measuring signal strengths from common control channels between the D2D UE and the coupled base station. Measuring the shared downlink quality at block 204 may be initiated by the coupled base station that may request periodically some of the measurements, in particular those related to the links between the UEs and the BS.

Considering cellular downlink quality and dedicated links at block 212 may include taking into consideration the dedicated links in determining the suitable D2D mode. The dedicated links may be allocated either dynamically, semi-statically or statically. A D2D link may be dynamically allocated by the coupled base station, according to a number of factors including overall system-wide quality of service (QoS) targets, available network resource at the time, and the like. Alternatively it may be allocated semi-statically by a signaling session between the coupled base station and the D2D UE. Yet another alternative may be to have the dedicated link allocated statically based on an industrial standard. In determining the suitable D2D mode, if the reusing downlink mode or reusing uplink mode is not practical or does not meet a QoS target, and a dedicated uplink or downlink happens to be available and happens to meet the QoS target, a dedicated uplink mode or dedicated downlink mode may be selected as the suitable D2D mode.

Considering cellular downlink quality at block 212 may also include considering to revert to the cellular mode when none of the other D2D modes are available. For example, if the measured cellular downlink quality is suitable and none of the other D2D modes, including reusing downlink mode, reusing uplink mode, dedicated uplink mode and dedicated downlink mode, is available, the cellular mode may be used for establishing a connection between the two pairing D2D UEs.

Taking into account the MIMO capabilities at block 214 may include using the MIMO capabilities to reduce interferences from the coupled base station. If the D2D UE 102 or 104 is equipped with multiple antennas, the MIMO capabilities may be used to minimize interference towards the coupled base station as described below. In an FDD operation, the D2D UE with the MIMO capabilities may send sounding signals to the coupled base station that may send back the measured channel to the D2D UE. This measurement may be done on a per request basis or periodical basis. For a TDD cellular operation, the base station and the D2D UE may be calibrated in such a way that channel reciprocity may be used, and the D2D UE may measure the channel from the control part of the frame. If the channel reciprocity is not available, a similar procedure may be applied as for the FDD operation. With the feedback from the sounding channel, the D2D may optimize the transmission power to minimize the interferences.

Taking into account the MIMO capabilities at block 214 may also include taking into account the preceding capabilities of the coupled base station combined with the power control procedure. A D2D mode may be suitable if the D2D UE can apply preceding to reject interference, and adjust the backoff value in such a way that the interference rejection is considered. In case of reusing the shared resource together with another ongoing D2D transmission, the base station may request the active D2D UEs to start using preceding with interference rejection. Thus, the mode selection procedure may take into account the preceding capabilities of the base station, which is determined by the number of antennas at the base station as well as the number of streams allocated to ongoing cellular transmissions.

Determining the suitable D2D mode for a D2D connection at block 216 may include considering various link qualities available to the D2D UE, based at least in part on measured link qualities and UE constraints as described above from block 202 to block 212. Determining the suitable D2D mode may include considering available D2D modes, including the reusing uplink mode, reusing downlink mode, the dedicated uplink mode, dedicated downlink mode and the cellular mode.

One example of determining the suitable D2D mode may be sorting the available D2D modes according to one or more criteria such as link throughput, interference levels, and the like and then selecting the suitable D2D mode according to the sorted list of the D2D modes. When none of the above mentioned D2D modes is available, then the cellular mode may be considered for establishing a connection between the pairing D2D UEs. In determining the suitable D2D mode, a set of criteria and UE constraints may be considered. These UE constraints may include transmitting power values, a link quality, a target data rate, an uplink cellular UE interference level, and a neighbor downlink cellular UE interference level. These UE constraints may also include a neighbor shared uplink interference level, and a neighbor shared downlink interference level, a base station interference level, a maximum allowed transmitting power, and one or more UE QoS targets. For example, when reusing uplink or downlink is employed, the link quality and achievable data rates depend not only on the location of the devices and radio channel conditions, but also the transmitting power level. In addition, the MIMO capabilities of the D2D UE may be considered as well.

Communicating the determined D2D mode to a coupled base station at block 218 may include sending the determined D2D mode to the coupled base station, along with the resource allocation information. The coupled base station may take the determined D2D mode into consideration in subsequent resource allocations.

Determining a second D2D mode for a second D2D connection at block 220 may include repeating part or the entire process of block 202 to block 218 to establish a second D2D connection to a third D2D UE. This may allow two or more D2D connections to be established to form a D2D communication cluster. With the D2D communication cluster, multiple D2D UEs may communicate with each other via direct, bidirectional D2D connections.

Figure 3:
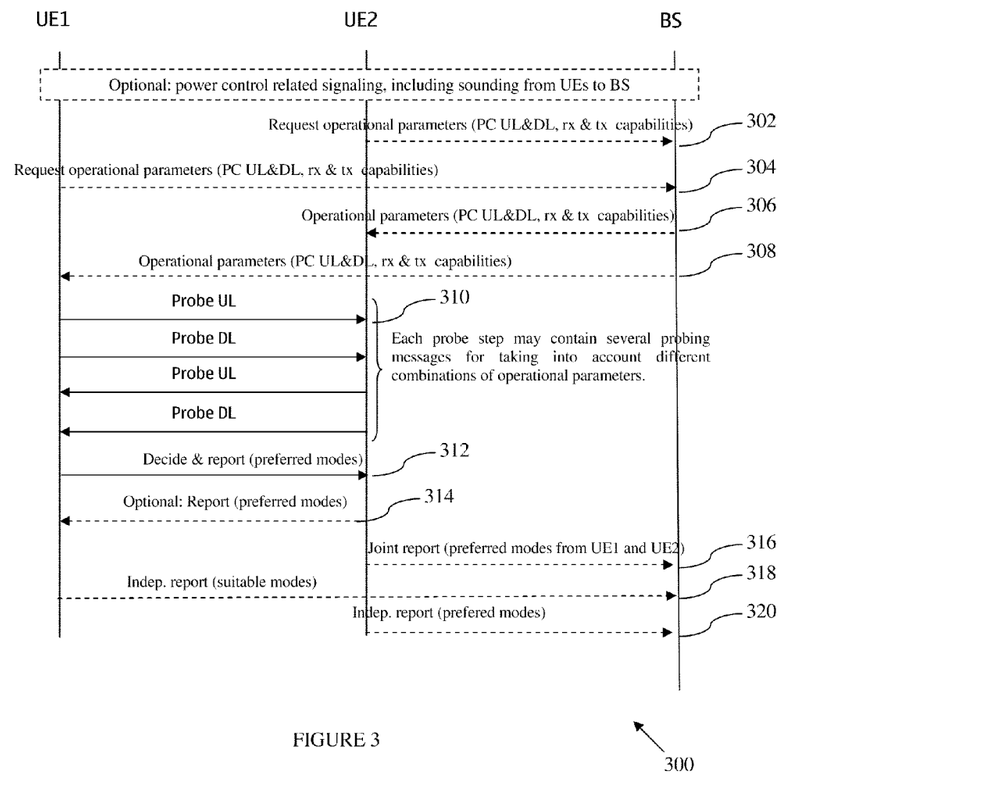
FIG. 3 illustrates an example flow diagram for selecting a D2D mode.

FIG. 3 illustrates an example flow diagram 300 for selecting a D2D mode. The flow diagram 300 may include requesting operation parameters by UE1 and UE2 from the base station at step 302 and step 304 and providing the requested operation parameters by the base station to the requesting UE1 and UE2 at step 306 and step 308. Next are probing signal exchanges between the two D2D UEs UE1 and UE2 at step 310. Each probe step may contain several probing messages to take into account different combinations of operational parameters. The UE1 may determine a preferred D2D mode and optionally report the mode to the UE2 at step 312. The UE2 may optionally report back its own preferred D2D mode at step 314. Then UE2 and UE1 may jointly or individually report the preferred D2D mode to the base station at step 316 through step 320.

FIG. 4 illustrates an example D2D mode module 400 at a D2D UE such as UE1 or UE2 in FIG. 1. The D2D mode module 400 may include a D2D mode analysis module 414, an interface module 416, and a UE MIMO module 418. Although FIG. 4 illustrates one example of a D2D mode module 400, various changes may be made to the module 400 without departing from the principles of this disclosure.

The D2D mode analysis module 414 may be configured to determine the suitable D2D mode for a D2D connection based at least in part on the shared uplink quality, the shared downlink quality, the dedicated uplink quality, the dedicated downlink quality, and one or more D2D UE constraints. It may consider the cellular link qualities and one or more of dedicated links for determining the suitable D2D mode. The D2D mode analysis module 414 may also help determine a second D2D mode for a second D2D connection to form a D2D communication cluster wherein the second D2D connection is one of a shared uplink, a shared downlink, a dedicated uplink, and a dedicated downlink.

The interface module 416 may be configured to measure the shared downlink quality based at least in part on its power value and measure the shared uplink quality based at least in part on its power value. The interface module 416 may obtain a power value for the uplink from a standard definition or a coupled based station. It may also obtain the power value for the downlink link from the standard definition or the coupled based station. It may measure a cellular link quality by receiving a probing signal, measuring interferences from one or more of neighbor devices, and determining the strength of the received probing signal after comparing the received signal against the measured interferences.

The UE MIMO module 418 may be configured to take into account a MIMO capability of the coupled BS that may cancel substantial amount of interference toward the D2D UEs and reduce residual interference from the coupled base station when it is necessary to do so. The UE MIMO module 418 may reduce a transmitting power based at least in part on the number of antennas at the coupled base station and taking into account the MIMO capability of the D2D UE. It may also reduce the interference towards the coupled base station via applying precoding or adjusting a backoff value, or both.

Figure 5:
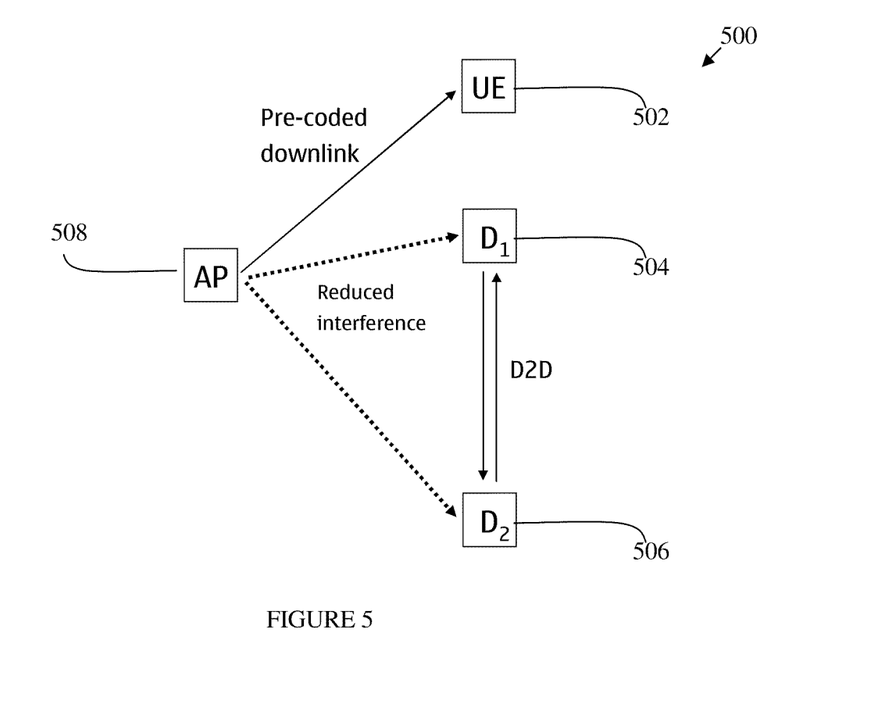
FIG. 5 illustrates an example system for preceding process.

FIG. 5 illustrates an example system 500 for using precoding to reduce interference to D2D connections. The system 500 may include an access point (AP) 508, a UE 502, a D2D UE D1 504, and a D2D UE D2 506. The access point 508 may be viewed as a generic base station. There is a D2D connection between D1 504 and D2 506. The base station and UEs may be equipped with multiple antennas, which add more degrees of freedom for the D2D mode selection. For example, it may be practical to apply precoding at the access point 508 to reduce interference towards the D2D UEs 504 or 506, or both UEs simultaneously. Reduced interference may allow the D2D connection in downlink direction with reduced transmission power and higher signal to interference plus noise ratio (SINR).

As shown in FIG. 5, the D2D UE 504 may select a reusing downlink mode, sharing downlink resources with the other UE 502. The D2D connection between D2D UE 504 and D2D UE 506 may receive a high-level interference from the access point 508, because the access point 508 may be always transmitting with full power in the whole band. On the other hand, it may not be practical to increase the transmission power of the D2D UE 504 and UE 506, because the location of the cellular receiver may be unknown. Thus it is important that the access point 508 may apply a precoding scheme and may reject interference towards the D2D receiver while enhancing the downlink transmission using the remaining degrees of freedom. For example, assuming the access point 508 has $N_{tx}$ antennas and D2D transmissions are limited to $N_s$ streams, the access point 508 may reject interference up to $\lfloor N_{tx}/N_s \rfloor$ UEs, where $\lfloor \cdot \rfloor$ denotes the largest integer smaller than ($\cdot$). Hence, the access point 508 may reject interference toward $N_r$ D2D UEs, where $0 \leq N_r \leq \lfloor N_{tx}/N_s \rfloor$. The remaining $N_{tx} - N_r N_s$ degrees of freedom may be used by the access point 508 to enhance downlink transmission or beamforming or to transmit multiple streams to the cellular UE 502. The number of streams $N_s$ may be lower than the number of antennas at the D2D receiver. The relations above may assume that the effective channel between the access point 508 and the D2D receiver is known, which includes the effect of the receiver processing at the D2D receiver. Without the information about the effective channel, $N_s$ in the relations above may need to be replaced by the number of antennas at the D2D receiver.

Figure 6:
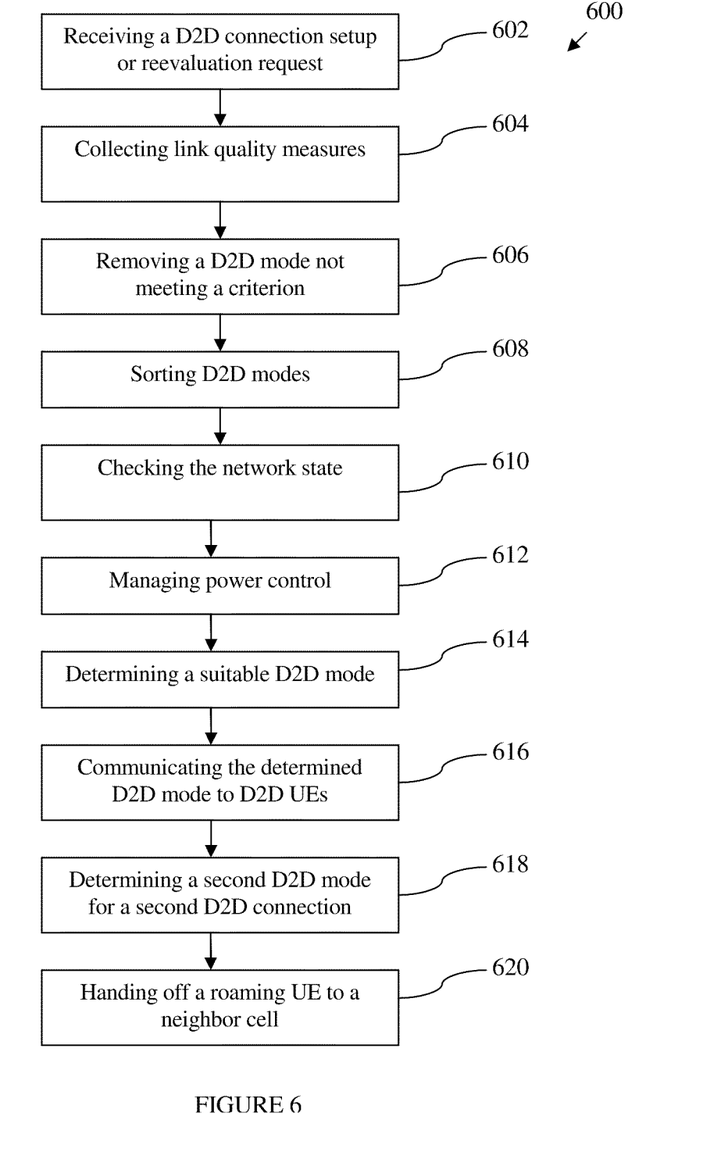
FIG. 6 illustrates an example method for determining D2D mode at a base station.

FIG. 6 illustrates an example method 600 for determining D2D mode at a base station. The method 600 may include receiving a D2D connection setup or reevaluation request at block 602, collecting link quality measures at block 604, and removing a D2D mode that fails to meet a criterion at block 606. The method 600 also may include sorting D2D mode list at block 608, checking the network state at block 610 and managing power at block 612, and determining a suitable D2D mode at block 614. The method 600 also may include communicating the determined D2D mode to the D2D UEs at block 616, determining a second D2D mode for a second D2D connection at block 618, and handing off a roaming UE to a neighbor cell at block 620. Other embodiments of the method 600 with different sequences of steps could be used without departing from the scope of this disclosure. In an example embodiment, the method 600 is performed by the BS D2D Module 700 of FIG. 7 and the base station 108 of FIG. 1.

Receiving the D2D connection setup or reevaluation request at block 602 may include receiving a request from a D2D UE such as D2D UE 102 or D2D UE 104 of FIG. 1 to establish or reevaluate a D2D connection between the D2D UE 102 and D2D UE 104. The request may include a request for a specific D2D mode such as a reusing downlink mode or dedicated uplink mode. The base station 108 may or may not be able to satisfy the request for specific D2D mode, depending on the network state and other factors.

Collecting D2D link quality measures at block 604 may include instructing the UE 102 and UE 104 to collect link quality measures as described in block 204 and block 208 and to collect the link quality measures from the UE 102 and the UE 104.

Removing a D2D mode at block 606 may include filtering out the D2D modes that don't meet a QoS threshold or other criteria based on the collected link quality measures. For example, the measured quality of the shared uplink may be below a minimum threshold and thus the reusing uplink D2D mode is removed from further consideration.

Sorting the D2D mode list at block 608 may include ranking remaining D2D modes according to one or more criteria such as throughput of the link and overall system load. For example, data rate of potential D2D links may be used to rank the D2D modes in a descending order. A suitable D2D mode may be the D2D mode that offers the highest D2D throughput with the lowest transmission power.

Checking the network state at block 610 may include collecting the network state information from the perspective of the base station. For example, if a shared downlink is more loaded than a shared uplink, the reusing shared uplink mode may be preferable for the D2D communication over the reusing the shared downlink mode. When some existing D2D connections are already reusing the resources under consideration, the base station may change the power level settings for the ongoing D2D connections in order to accommodate the interference from a new D2D connection, given that the new settings may still meet the desired QoS targets for both the new and existing D2D connections. If the network is fully loaded with both D2D and cellular connections, the base station may reject the request for a new D2D connection. For another example, some D2D modes may not be practical because the maximum amount of D2D connections reusing the shared uplinks or shared downlinks may have already been reached. Thus, various aspects of the overall network state may be taken into consideration in determining the suitable D2D to help achieve a system-wide optimal performance.

Managing power control at block 612 may include adjusting transmission power to control interference in determining the suitable D2D mode. The receiver capabilities of the base station may be taken into account for the D2D mode selection, in particular for selecting the reusing shared uplink D2D mode. In this case, the base station may accept another D2D connection if the base station is able to reject or minimize the interferences from a cellular connection while keeping the link quality for the cellular connection at an acceptable level. The base station's ability to reject the cellular interference may depend on the number of antennas available at the base station receiver, as well as on the number of spatial dimensions used in cellular uplink transmissions. For example, assuming the base station has 4 receive antennas while a cellular UE is transmitting in uplink with 2 streams, the base station may be able to reject two further spatial dimensions. If the D2D connection is to use a single-stream transmission, the base station may cancel interference from both pairing D2D UEs.

Managing power control at block 612 also may include applying a power control mechanism to control interferences from D2D connections that reuse shared uplink. In one embodiment, the power control mechanism may assume that the D2D UEs may be informed of the power level that the D2D UEs may use for uplink communications. The base station may set a power control target for the D2D UEs which include a backoff value with respect to a cellular power control target. The base station may compensate further the interference from the D2D connection by directing the cellular UEs to increase their transmitting power. This power control mechanism may allow for more flexibility for the D2D mode selection. For example, in cases where there are already ongoing D2D connections reusing shared uplink resources, the base station may request that the D2D pairs to apply a larger backoff in their transmissions, and cellular UEs to temporarily increase their transmission power.

The base station may decide to use some degrees of freedom offered by multiple antennas to decrease the interference to/from D2D connections. In downlink direction, the MIMO capability may decrease the interference towards the D2D receiver and thus increase the D2D link quality. In the uplink direction, the MIMO capability may decrease the interference towards the base station, which may increase the allowed transmitting power in order to improve the quality of the D2D link. The base station may take the resulting link quality improvements into account when sorting the D2D modes.

Determining a suitable D2D mode at block 614 may include taking into account various factors such as the ranking of the D2D modes, the network state, target QoS, the power values and the like, and selecting a suitable D2D mode. Communicating the determined D2D mode to the D2D UEs at block 616 may include sending to the D2D UE pairs the determined D2D mode along with relevant control information such as power values.

Determining a second D2D mode for the second D2D connection at block 618 may include repeating part of or entire process of block 602 to 616 to establish the second D2D connection to a third D2D UE. This may allow two or more D2D connections to be established to form a D2D communication cluster. With the D2D communication cluster, multiple D2D UEs may communicate with each other via direct, bidirectional D2D connections. When a new D2D UE joins or leaves the cluster, the D2D mode selection procedure may be revisited for the members of the updated cluster. In addition, the operational state of the network may change during a D2D session. The mode selection procedure may be repeated at regular intervals or triggered by an event such as the D2D link quality dropping below a specific threshold, the cell load increasing beyond a specific point, the amount of available dedicated D2D resources decreasing beyond a specific point, or the like.

Handing off to a neighbor cell at block 620 may include handing off the D2D UE to a neighbor cell when the base station detects that the D2D UE has roamed into the neighbor cell. Part of or the entire process from block 602 to block 618 may be used to help the handoff process. The base station may need to coordinate the probing procedure for collecting link quality measures. The transmitting power to be used by the D2D UE during the probing may be set by the two base stations independently to take the situation of each cell into account.

FIG. 7 illustrates an example BS D2D module 700. The BS D2D module 700 may include a BS D2D mode analysis module 714, a BS interface module 716, and a BS MIMO module 718.

The BS D2D mode analysis module 714 may be configured to remove a D2D mode from a D2D mode list if the D2D mode fails to meet a quality criterion based at least in part on the collected plurality of link quality measures. The BS D2D mode analysis module 714 also may be configured to sort the D2D mode list based at least in part on the collected plurality of D2D link quality measures and to determine a suitable D2D mode based at least in part on the sorted D2D mode list, a network state, and one or more BS constraints.

The BS constraints may include one or more of the following: a neighbor uplink cellular UE interference level, a neighbor downlink cellular UE interference level, and a neighbor shared uplink interference level. The BS constraints also may include a neighbor shared downlink interference level, a base station interference level, a maximum allowed transmitting power, and a number of parallel active cellular streams. BS constraints also may include an expected receiver gain on each of the parallel active cellular streams, one or more QoS targets, a cell-wide load level, one or more admission control policies, a number of D2D UEs sharing a resource, and the like.

The BS interface module 716 may be configured to collect a plurality of link quality measures upon receiving a connection setup or reevaluation request from the D2D UE and the pairing D2D UE. The BS interface module 716 may be configured to handover one or more of the D2D UE and the pairing D2D UE to a neighbor cell when it detects that at least one of the D2D UE and the pairing D2D UE has roamed into the neighbor cell.

The BS MIMO module 718 may be configured to precode signals to reduce the interference toward the D2D UEs. The BS MIMO module may assist the D2D mode selection by separating the cellular UEs into groups according to the type of MIMO processing that may be needed from a UE. For example, UEs with 2-stream transmissions would be part of a group that may need at least two degrees of freedom for MIMO processing. Correspondingly, UEs that may need large beamforming gain may be assigned to a group that requires full degrees of freedom from BS MIMO processing.

The BS MIMO module 718 may take into consideration the D2D scheduling strategy in reducing interference toward the D2D UEs, because it may affect the number of spatial dimensions for the interference rejection. If the base station knows the transmission times of a D2D UE in a D2D pair, the BS MIMO module 718 may specifically target the interference in the direction of the D2D receiver. If the D2D UEs are in the dedicated link mode and the D2D UEs may agree on transmission/reception times without participation from the base station, the base station may need to reject interference towards both D2D UEs simultaneously, because it may not be aware which one is the receiver at a given time.

Without in any way limiting the scope, interpretation, or application of the claims appearing below, a technical effect of one or more of the example embodiments disclosed herein may be a method for determining a suitable D2D mode by a pair of communicating D2D UEs based on the power values, link quality measures and the like. Another technical effect of one or more of the example embodiments disclosed herein may be may be allowing a base station to decide a suitable D2D mode on behalf of the pair of communicating D2D UEs, based at least in part on link power values, link quality measures and the like.

Embodiments of the present invention may be implemented in software, hardware, application logic or a combination of software, hardware and application logic. The software, application logic and/or hardware may reside on a mobile station, a base station or other mobile computing device. If desired, part of the software, application logic and/or hardware may reside on a mobile station, part of the software, application logic and/or hardware may reside on a base station, and part of the software, application logic and/or hardware may reside on a second mobile station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes exemplifying embodiments of the invention, these descriptions should not be viewed in a limiting sense. Rather, there are several variations and modifications which may be made without departing from the scope of the present invention as defined in the appended claims.

What is claimed is:

1. A method, comprising:
   obtaining a downlink power control value including determining a maximum downlink transmitting power which device-to-device (D2D) user equipment (UE) may use on at least one cellular shared downlink resource;
   obtaining an uplink power control value including determining a maximum uplink transmitting power which device-to-device (D2D) user equipment (UE) may use on at least one cellular shared uplink resource;
   measuring a first link quality for reusing the at least one cellular shared downlink resource based at least in part on the downlink power control value;
   measuring a second link quality for reusing the at least one cellular shared uplink resource based at least in part on the uplink power control value; and
   determining a suitable device-to-device (D2D) mode for a first one of the device-to-device (D2D) user equipment (UE) to establish a first device-to-device (D2D) connection based at least in part on the first link quality, the second link quality, the downlink power control value and the uplink power control value;
   wherein determining the suitable D2D mode comprises selecting from among at least one dedicated mode and at least one shared mode, and each cellular shared downlink resource and each cellular shared uplink resource is a resource that may be shared among at least two D2D UEs and at least one cellular UE.

2. The method of claim 1, further comprising:
   obtaining the downlink power control value from at least one of a standard definition and a coupled based station;
   obtaining the uplink power control value from at least one of a second standard definition and the coupled based station;
   measuring a cellular downlink quality, a dedicated uplink quality and a dedicated downlink quality; and
   considering the cellular downlink quality, the dedicated uplink quality, and the dedicated downlink quality for determining the suitable D2D mode, wherein each of the dedicated uplink and the dedicated downlink is allocated in one of a dynamic allocation method, a semi-static allocation method, and a static allocation method.

3. The method of claim 1, further comprising determining a second suitable D2D mode for a second D2D connection to form a D2D communication cluster with the first D2D connection wherein the second D2D connection is one of a shared uplink, a shared downlink, a dedicated uplink, and a dedicated downlink.

4. The method of claim 3, wherein determining the suitable D2D mode comprises
   taking into account multiple-input and multiple-output (MIMO) antenna capabilities of a coupled base station to reduce interferences towards the first D2D UE in the shared downlink.

5. The method of claim 4, wherein determining the suitable D2D mode further comprises taking into account a MIMO antenna capability available at the first D2D UE to suppress interference towards the coupled BS in shared uplink wherein the reduced interference towards the coupled BS results in an adjustment of operational parameters including a backoff value.

6. The method of claim 1, further comprising at least one of:
   communicating to a coupled base station at least one of the measured first link quality, the measured second link quality, and a measured cellular link quality; and
   receiving a D2D mode assignment from the coupled base station.

7. The method of claim 1, wherein determining the suitable D2D mode further comprises taking into account one or more of a neighbor uplink cellular UE interference level, a neighbor downlink cellular UE interference level, a neighbor uplink interference level, a neighbor downlink interference level, a base station interference level, a maximum allowed transmitting power, and one or more UE quality of service (QoS) targets.

8. The method of claim 1, wherein determining the suitable D2D mode comprises selecting one of a reusing shared downlink mode, a reusing shared uplink mode, a dedicated downlink mode, a dedicated uplink mode, and a cellular mode.

9. A method comprising:
   obtaining a downlink power control value including determining a maximum downlink transmitting power which device-to-device (D2D) user equipment (UE) may use on at least one cellular shared downlink resource;
   obtaining an uplink power control value including determining a maximum uplink transmitting power which device-to-device (D2D) user equipment (UE) may use on at least one cellular shared uplink resource;
   based at least partially on the obtained power control values and the determined maximum transmitting powers, collecting a plurality of link quality measures upon receiving one of a device-to-device (D2D) connection request and a D2D connection reevaluation request from a D2D user equipment (UE) and a pairing D2D UE;

removing a D2D mode from a D2D mode list if the D2D mode fails to meet a quality criterion based at least in part on the collected plurality of link quality measures;

sorting the D2D mode list based at least in part on the plurality of D2D link quality measures;

determining a suitable D2D mode based at least in part on the sorted D2D mode list, a network state, and the maximum transmitting powers for at least one of the D2D UE or the pairing D2D UE;

creating the D2D mode list for the D2D UE and the pairing D2D UE, based at least in part on available network resources and the network state;

scoring each D2D mode of the D2D mode list based at least in part on the collected plurality of link quality measures;

checking the network state based at least in part on a number of established D2D connections and a number of maximum allowed connections in the network; and communicating the suitable D2D mode to the D2D UE and the pairing D2D UE; and determining a second suitable D2D mode between the D2D UE and a third D2D UE to form a D2D communication cluster;

wherein determining the suitable D2D mode comprises selecting from among at least one dedicated mode and at least one shared mode and each cellular shared downlink resource and each cellular shared downlink resource is a resource that may be shared among at least two D2D UEs and at least one cellular UE.

10. The method of claim 9, wherein determining the suitable D2D mode further comprises:

considering a D2D mode on the sorted D2D mode list with a highest score; and checking whether the D2D mode with the highest score is consistent with the network state.

11. An apparatus, comprising:

a first module configured to:

obtain a downlink power control value including determining a maximum downlink transmitting power which device-to-device (D2D) user equipment (UE) may use on at least one cellular shared downlink resource, obtain an uplink power control value including determining a maximum uplink transmitting power which device-to-device (D2D) user equipment (UE) may use on at least one cellular shared uplink resource, measure a first link quality based at least in part on the downlink power control value, and measure a second link quality based at least in part on the uplink power control value; and a second module configured to determine a suitable device-to-device (D2D) mode for the D2D UE to establish a D2D connection to a pairing D2D UE based at least in part on a constraint comprising at least one of the first link quality, the second link quality, and a maximum transmitting power for the D2D UE;

wherein the apparatus is coupled to a base station (BS) comprising a BS D2D module configured to control interferences to the D2D UE and the pairing D2D UE after the D2D connection is established between the D2D UE and the pairing D2D UE;

wherein determining the suitable D2D mode comprises selecting from among at least one dedicated mode and at least one shared mode, and each cellular shared downlink resource and each cellular shared uplink resource is a resource that may be shared among at least two D2D UEs and at least one cellular UE.

12. The apparatus of claim 11, wherein the BS D2D module is further configured:

to collect a plurality of link quality measures upon receiving a connection request from the D2D UE and the pairing D2D UE;

to remove an D2D mode from a D2D mode list if the D2D mode fails to meet a quality criterion based at least in part on the collected plurality of link quality measures;

to sort the D2D mode list based at least in part on the collected plurality of D2D link quality measures; and to determine a suitable D2D mode based at least in part on the sorted D2D mode list, a network state, and at least one BS constraint.

13. The apparatus of claim 11, wherein the base station further comprises a multiple-input and multiple-output (MIMO) antenna module configured:

to precode signals to reduce the interference towards the D2D UE; and to take into consideration MIMO capabilities of at least one of the D2D UE and the pairing D2D UE.

14. The apparatus of claim 11, wherein the BS D2D module is further Configured to handover at least one of the D2D UE and the pairing D2D UE to a neighbor cell when it detects that at least one of the D2D UE and the pairing D2D UE has roamed into the neighbor cell.

15. The apparatus of claim 11, wherein the constraint comprises at least one of a neighbor uplink cellular UE interference level, a neighbor downlink cellular UE interference level, a neighbor uplink interference level, and a neighbor downlink interference level, a base station interference level, a maximum allowed transmitting power, a number of parallel active cellular streams, an expected receiver gain on each of the parallel active cellular streams, at least one of quality of service (QoS) targets, a cell-wide load level, at least one of admission control policies, direction of a link, and a total number of D2D UEs sharing a resource.

16. The apparatus of claim 11, further comprising a UE MIMO module configured to adjust the measured interference levels based on a precoding of the coupled base station.

17. The apparatus of claim 11, wherein the suitable D2D mode is one of a reusing downlink mode, a reusing uplink mode, a dedicated downlink mode, a dedicated uplink mode, and a cellular mode; and the apparatus is one of a $3^{rd}$ generation partnership project (3GPP) long-term evolution-advanced (LTE-A) mobile station, and a $4^{th}$ generation (4G) mobile station.

* * * * *